United States Patent [19]

Gladish

[11] 3,952,666
[45] Apr. 27, 1976

[54] VEHICULAR TRANSPORTATION SYSTEM
[76] Inventor: Herbert E. Gladish, 724 Echo Drive, Ottawa, Ontario, Canada, K1S 1P3
[22] Filed: Nov. 7, 1974
[21] Appl. No.: 521,594

[30] Foreign Application Priority Data
Nov. 15, 1973 Canada ............................. 185869

[52] U.S. Cl. ........................... 104/23 FS; 104/134; 308/DIG. 1; 308/5 R
[51] Int. Cl.² ......................................... B61B 13/08
[58] Field of Search ..................... 104/23 FS, 134; 180/116, 117; 214/1 BE; 308/3 R, 3 A, 3 B, 3 C, 6 R, 6 B, 5 R, DIG. 1

[56] References Cited
UNITED STATES PATENTS
| | | | |
|---|---|---|---|
| 3,174,440 | 3/1965 | Cockerell | 104/23 FS |
| 3,602,147 | 8/1971 | Hart | 104/23 FS |
| 3,799,061 | 3/1974 | Bertin | 104/23 FS |

Primary Examiner—Robert B. Reeves
Assistant Examiner—D. W. Keen
Attorney, Agent, or Firm—H. Wayne Rock

[57] ABSTRACT

A transportation system in which a vehicle is adapted for guided longitudinal movement along a prepared track having a transversely curved support surface. In addition to a body and propulsion means the vehicle has at least two support members flexibly connected thereto for limited articulation relative thereto, each support member having an outer surface curved to be complementary with the curved track surface. One of the curved surfaces will be generally concave in cross-section, the other generally convex. The concave surface has a plurality of nozzles therein for projecting pressurized fluid at an angle thereto to form a wedge of pressurized fluid between the mating convex and concave surfaces. The wedge diminishes in thickness in the direction of projection and supports the support members above the track. The wedge forces are balanced and the vehicle does not require additional guiding means. Also the wedge is dynamic and does not require a skirt for containment in its zone of influence.

7 Claims, 9 Drawing Figures

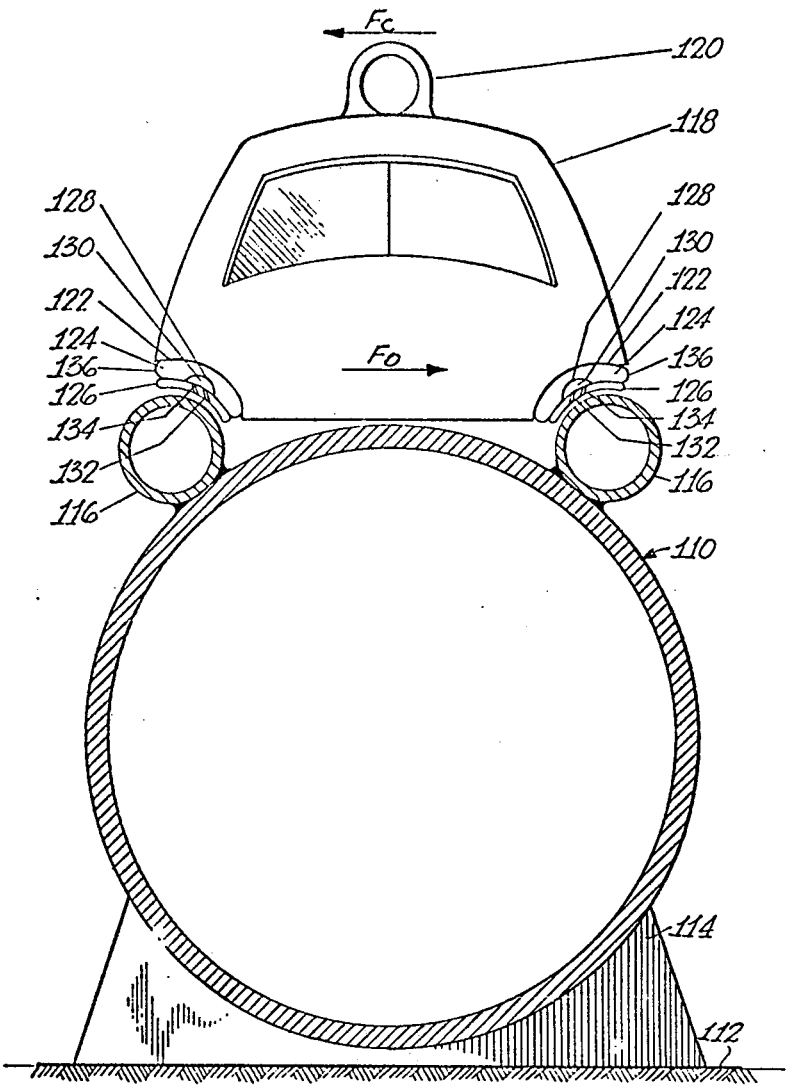
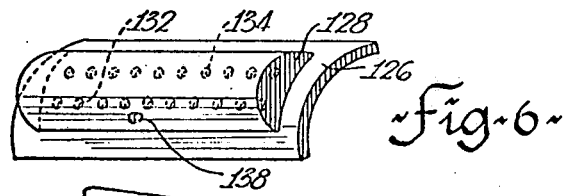
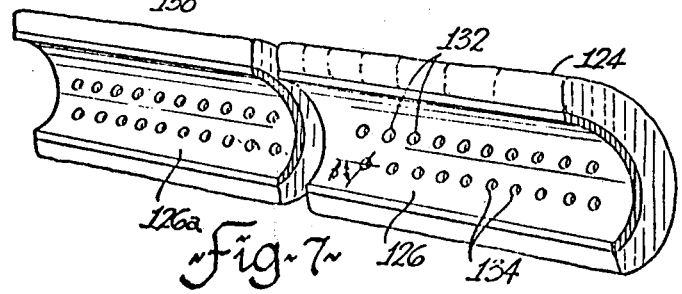

VEHICULAR TRANSPORTATION SYSTEM

BACKGROUND OF THE INVENTION

The present invention relates in general to a rapid transit system and in particular to a guided transportation system in which the load carrying vehicles are supported on a wedge of pressurized fluid above a transversely curved track surface.

The rapid, efficient transport of people and cargo is fast becoming a high priority concern for governments at all levels. Cities are becoming clogged with automobiles belching forth toxic impurities, the automobiles often carrying but one person each. Fuel supplies are becoming scarce and rationing thereof is in the forseeable furture. It therefore becomes imperative to examine other modes of transport, especially for the "commutor" who travels the same route daily to and from his place of business. The bicycle is one alternative; rapid mass transport is another.

In the latter category great strides have been taken recently in attempts to obtain optimum carrying capacities and speeds for relatively low energy expenditures. Vehicles using air cushions, magnetic attraction or magnetic repulsion for support above a guiding track have been proposed, and in some instances produced. These vehicles may use linear induction motors, jet engines or mechanical interaction with the track for propulsion therealong.

None of the systems proposed to date may properly be considered an optimum system for each has its own particular and peculiar drawbacks. And, considering the rate of advancement in the field, a system which enjoys popularity today may be obsolete by tomorrow.

The air cushion vehicle, for example, has been known for some time and considerable effort has been expended in adapting it to a tracked configuration whereby it may be "trained" with other such vehicles for the transport of passengers and cargo over predetermined routes. These routes may take the form of rails or tracks which are particularly adapted to the vehicle configuration and often take the form of an inverted "T" in cross-section. The vehicle is then guided by the rail, in the case of the illustrated rail with a portion of the vehicle being adjacent each side of the upright of the rail and with a connecting portion of the vehicle being adjacent the uppermost horizontal surface of the rail. Vertical support is usually by way of air cushions attached to the aforementioned vehicle connecting portion acting on the horizontal surface of the rail upright whereby the vehicle is supported on a cushion of air a small distance above the track.

It is readily apparent that there must also be lateral control of the vehicle relative to the track since contact between the track and the vehicle is definitely not desirable, except under braking conditions. This lateral control may be obtained through the action of horizontal jets of pressurized air acting on the vertical, upright surfaces of the guiding rail. This arrangement can lead to some instability especially in curves where the centrifugal forces generated must be compensated. Compensation can be achieved by altering the relative strengths of the horizontal forces on the inside and the outside of the curve, or by banking the track. Either alternative requires considerable engineering skill in view of the low friction conditions achievable with the air cushion effect. The use of wheels for guiding or support of the vehicle would reduce the speeds attainable by the vehicle and would increase noise, power requirements and vibration, each a variable which is desireably kept at a minimum.

SUMMARY OF THE INVENTION

Contrary to previous guided air cushion vehicles whish use opposed horizontal components of pressurized air for guidance relative to the rail, the present invention utilizes the forces generated by a single unidirectional flow of a relatively high pressure fluid at low flows to form a thin self-balancing wedge of fluid for combined guiding, support and propulsion force components.

The wedge of fluid is dynamic and has no requirement of discrete means to retain it in position. Thus use of the wedge obviates the necessity of a skirt to form a pressure support chamber below the vehicle support as in previous air cushion vehicles.

The transportation system of the present application utilizes a "fluid wedge support" phenomenon described in my Canadian patent application No. 140,133 for an Air Conveyor, to support, guide and propel a vehicle on a prepared track, the guiding feature being inherent in the properties of the phenomenon. In most instances air will be the working fluid and the system may be either active or passive: i.e. generation of the support wedge may be due to mechanism in the vehicle or in the track, respectively.

Whether the system be active or passive, the same structural or geometric relationship between the vehicle and the track will apply. The track will have a curved cross-section and the vehicle will be provided with a support section which has a complementary mating curve. If, for example, the track is generally convex in cross-section, the vehicle's support section will be generally concave and probably of slightly greater "radius of curvature". Quotations are used on this last-mentioned term since the curved surfaces may not necessarily be arcs of circles, although such are preferred, yet the term is very graphic in illustrating the dimensional relationship between generalized mating curves.

IN In operational mode, a wedge of supporting fluid such as air is generated in the space formed between the two mating curved surfaces. The fluid is projected from the concave surface at an angle thereto towards the convex surface and exits from the restricting gap between the surfaces at the outermost edge of the concave surface and at the rear thereof. Due to the reactions set up by the projecting fluid there will be a relative lateral displacement between the bodies provided with the mating surface such that the space between the surfaces progressively diminishes in height or thickness in a direction towards the gap, that direction being the direction of projection of the fluid.

The wedge in effect is compound in nature in that its properties change as the thickness of the gap decreases. In the vicinity of fluid projection support is obtained through the containment of pressurized fluid within a relatively constant volume, much as in an air cushion vehicle. But as the gap becomes thinner, the escaping air must pass through an extremely narrow space and the system takes on the attributes of an air bearing. Thus vehicular support comes from the compound nature of the wedge forces. Also, since escaping air is necessary for operation of an air bearing there cannot be a skirt along that edge and since projecting fluid along the thick edge effectively seals that edge against air escape there is no need for a separate skirt along that edge.

It is evident that if the angle of projection has a longitudinal component as well as vertical and horizontal components longitudinal motion of the vehicle is also possible. In fact, tests have shown that for a given power setting the load carrying capacity of the vehicle is enhanced by having a longitudinal component of fluid projection. The carrying capacity can also be enhanced by providing labyrinth-type seals along the rear edge of the vehicle in order to increase the supporting pressure contained in the wedge zone.

Lateral forces imposed on the vehicle are automatically compensated for by the supporting wedge. Forces in the same direction as the lateral direction of projection are opposed by the forces of projection whereas lateral forces in the opposite direction are opposed by the compressed fluid in the narrowest portions of the diminishing support space as in air bearings. In this manner the vehicle is stably supported on the track and hence the necessity of a separate guide rail is obviated. The vehicle merely follows the track wherever it may lead, the wedge forces automatically compensating for lateral instabilities, whether due to wind, curve negotiation, track changes etc., to maintain the system in a balanced condition.

Needless to say the vehicle/guideway configuration can have many physical expressions, each having properties which enhance its applicability to particular situations. In most instances the vehicle will have a streamlined outward appearance to reduce drag and to appeal to the aesthetic senses of the user. Often the vehicle will be "trained" to other similar vehicle units whereby the number of passengers carried may be increased considerably.

The guideway will mate with the particular vehicle configuration chosen and hence it must be designed concurrently with the vehicle. The guideway may be at, above or below the ground surface and it may have its vehicle-adjacent surface generally concave or convex depending on the overall configuration chosen. In some instances the guideway can see dual duty, carrying a flowable product such as oil if it has a tubular cross-section. If the flowable product is heated, as well, the heat will be useful in keeping the tracks clear of ice or snow in the winter time. Dual, or even triple-duty guideways would find their greatest value in highly congested urban areas and in rural or wilderness areas where the costs of field installation are high and prohibitive of parallel systems.

It would be ideal for the rail system to be straight and horizontal but urban and rural terrain will not permit such a system. It thus becomes necessary to provide means for negotiating curves, whether they be horizontal or vertical. One such method involves the provision of articulated vehicle support means, each vehicle having at least two such means. Thus the length of each support means is reduced and the curve that can be negotiated thereby can be made sharper. Preferably, the curves in a multiple rail system will be banked to account for centrifugal forces. In many instances it may be necessary to articulate three, four, or more such support means together so that high loads may negotiate curves of smaller radius. Articulation may be exercised in any of the known ways, one of which is the whiffle tree.

Another very desirable characteristic of a vehicular transportation system using the present invention is a minimum gap betweeen the vehicle support means and the support surface of the track. A small gap, as against a large gap, reduces the volume of support fluid required and increases the efficiency of the system considerably by increasing the load which can be carried at any one power setting. The gap can be reduced by having the curvature of the support means approximately equal to that of the track support surface, a condition difficult and expensive to maintain with large scale manufacturing equipment. Alternatively, one of the support surfaces can be covered with a "compliant" material which is slightly flexible under the influence of the support jets. This material, which may be of a plastic composition, displaces isself under the jet area effectively increasing the load carrying capacity by reducing the escape gap, as desired.

BRIEF DESCRIPTION OF THE DRAWINGS

The present invention will now be described in greater detail and with reference to the drawings wherein:

FIG. 5 shows a more sophisticated active system, in perspective.

FIGS. 6, 7 and 8 show various views of a vehicle support member as used in an active system.

DETAILED DESCRIPTION OF THE INVENTION

Figure 1:
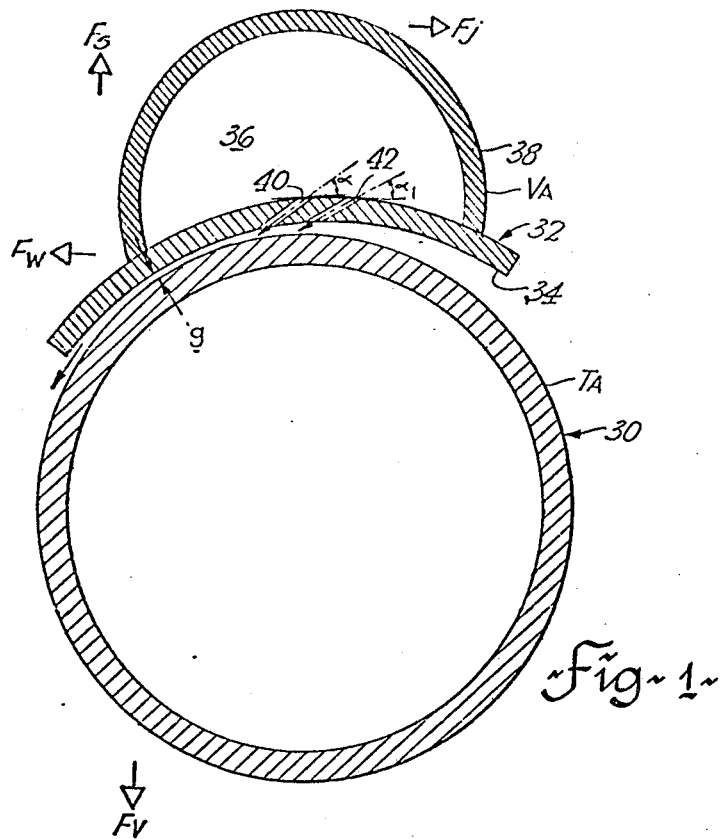
FIG. 1 shows the basic configuration for an active system, in cross-section.
Figure 2:
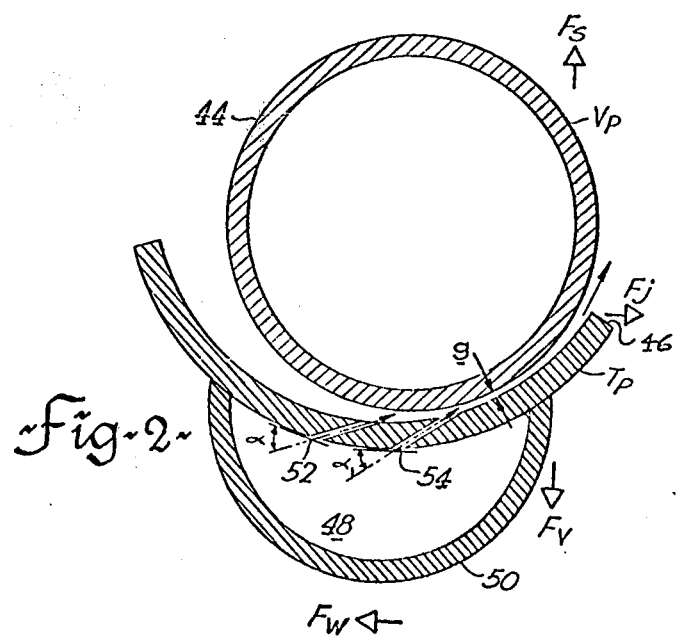
FIG. 2 shows the basic configuration for a passive system, in cross-section.

FIGS. 1 and 2 illustrate the fundamental principles underlying the present invention in the two basic embodiments thereof. In FIG. 1 the active system is shown wherein support power is generated on board the vehicle $V_A$ for supporting the vehicle above a support track $T_A$. FIG. 2 shows the passive system wherein support power comes from the track $T_P$ rather than from the vehicle $V_P$. It is understood that there are many various configurations of the two basic systems, some of which will be described hereinafter. FIGS. 1 and 2 are only intended to give a schematic representation of the systems of the present invention.

Referring now to FIG. 1, it is evident that the support track $T_A$ for the vehicle $V_A$ merely comprises an annular element 30 which may, for example, be a pipe or other extruded form. The cylindrical shape of the track is desirable, however, because of its ability to withstand bending stresses and its ability to carry heavy loads. The main criterion for the track is that it should have a generally convex cross-section although that cross-section need not be circular. Preferably the outer surface of the track should be smooth and hence a seamless extrusion would probably be a desirable section for the track.

The vehicle is represented by reference number 32 and it is understood that in addition to the support means described herein, the vehicle is provided with body means for carrying personnel or cargo and propulsion means for effecting longitudinal movement on the track.

The support means comprises a support member 34 which may be referred to as a "shoe". Shoe 34 is generally concave in cross-section and has a radius of curvature no less than that of the support area of track 30. The term "radius of curvature", while bringing arcs of circles to mind, is used in this instance to graphically illustrate the dimensional relationship between the support element of the vehicle and the support area of the track. It is intended that the vehicle and the track have support surfaces that are complementary in cross-section so that they can mate with a minimum clearance therebetween.

A plenum chamber 36 is formed over the shoe 32 by plenum wall 38. The plenum chamber will be supplied continuously with a medium, usually air, at predetermined pressures. The means for supplying air to the plenum chamber are not illustrated since in most instances the supplying can be effected in many ways. Any source of pressurized fluid, such as a pump or a bleed from a gas turbine, will be sufficient to maintain the chamber 36 at its optimum pressure.

Located within the support member 32 are sets of nozzles 40 and 42 communicating the plenum chamber 36 with the atmosphere. It is intended that each set of nozzles be spaced from the other transversely of the shoe and that the nozzles of each set be spaced from each other longitudinally of the shoe.

Each nozzle of sets 40 or 42 is angled in the shoe at an angle $\alpha$ or $\alpha_1$ respectively relative to the tangent taken on the inside surface of shoe 34 at the point of intersection of that inside surface with the center line of the nozzle in question. Tests have shown that the optimum angle lies between 15° and 60° for most load capability situations. It is understood that if the nozzles 40 and 42 are angled longitudinally as well as transversely, the efflux will supply a propulsive force component as well as increased support and guiding force components.

The support phenomenon created by jets of pressurized fluid exiting from nozzles 40 and 42 will now be described.

As can be seen in FIG. 1 the jets exit into a gap or clearance $g$ which is formed between the vehicle support surface and the track. The gap $g$ decreases in thickness in the direction of projection of the jets and thus a "wedge" of pressurized fluid is formed in the gap. It is this wedge of fluid which supports, and guides, the vehicle on the track (and aids propulsion if the nozzles are suitably oriented). It is readily apparent from FIG. 1 and air support technology that a film of air at the proper pressure will support a considerable load. Thus the weight of the vehicle $F_v$ is supported by the film reaction $F_S$. In the transverse direction the reaction and impulse of the jets exert a force $F_j$ which tends to move the vehicle to the right as in FIG. 1. When this occurs, the gap $g$ is reduced and there is a consequent increase in the pressure in the gap, which pressure exerts a restoring force $F_W$ on the vehicle to balance the force of the jets. Thus, at the optimum design pressure the vehicle will be held in equilibrium slightly above the track and possibly slightly to one side of the longitudinal center line. This equilibrium or stability condition is inherent to the "wedge" support system and in the case of vehicular transportation eliminates the necessity for additional guiding means such as those already described for known tracked air cushion vehicles. As will be described in greater detail with respect to FIG. 8, the jets exiting from nozzles 40 fan out more or less symmetrically about their centre lines and provide the greatest amount of wedge fluid. Assuming a longitudinal orientation of the nozzles, a desirable feature, the jets issuing from nozzles 42 will rapidly assume an orientation parallel to the longitudinal axis of the shoe and will form a longitudinal boundary of pressurized fluid which effectively prevents the escape thereby of wedge fluid produced by the jets of nozzles 40. The jets of nozzles 42 will of course, provide supporting forces although they will probably be less than those of the wedge.

FIG. 2 illustrates the basic fundamentals of a passive transportation system wherein the support forces are generated in the track $T_p$ rather than in the vehicle $V_p$. While the vehicle is represented by the annular body 44 it is understood that this representation is schematic only and is intended to show the relationship between the support portion of the vehicle and the support portion of the track. As is readily seen from FIG. 2 it is intended that the vehicle (or its support) have a generally convex supporting surface, although, as described for the active system, that surface need not be defined by the arc of a circle.

The track is shown diagramatically as a concave trough having a radius of curvature at least as great as that of the vehicle's support surface. For clarity, it is shown as considerably greater in FIG. 2.

Below the trough 46 is a plenum chamber 48 defined by plenum wall 50. As with chamber 48 is provided with pressurized fluid, such as air, at an optimum predetermined pressure. As in the active system sets of nozzles 52 and 54 are longitudinally and transversely spaced in the trough to communicate the plenum chamber 48 with the atmosphere. Jets 52 and 54 are angled relative to the trough in the same manner as nozzles 40 and 42 it being noted that the sets of nozzles 52 and 54 may be positioned on opposite sides of the trough longitudinal center line, a configuration which may permit early generation of the support wedge. It is, however, preferred that the nozzle system be asymmetrically disposed substantially on one side of the longitudinal axis of the concave surface as seen in FIGS. 1 and 2.

The jets exitting from nozzles 52 and 54 create a wedge of pressurized fluid in the gap $g$ formed between the vehicle support member and the track supporting surface. This wedge diminishes in thickness in the direction of projection of the jets, the jets exerting a force $F_j$ on the vehicle and its support means tending to displace those units to the right as in FIG. 2. The force $F_j$ is balanced by the weight of the supported vehicle and by the wedge force $F_W$ due to the increased pressure created in the gap $g$ as the supported units tend to be displaced to the direction of projection of the jets. The weight supported is, of cource, balanced by the vertical components $F_s$ of the wedge force and hence the vehicle may be held in equilibrium by the jets and as with the active system the necessity for overt guiding of the vehicle beyond that attributable to the wedge phenomonon is redundant.

As with the active system it is desirable that nozzles 52 and 54 exert a longitudinal force component on the vehicle support due to the increase loading capability with such an orientation. In addition, the longitudinal force components of the jets will exert an end force on the rear surface of the vehicle support thereby aiding in the propulsion of the vehicle.

Many alternatives and more sophisticated configurations may be based on the basic phenomenon whereby unique, inexpensive, quiet and rapid transit systems are achievable. Some of the details and suggested embodiments are illustrated in FIGS. 3 to 9 and are described below.

Figure 3:
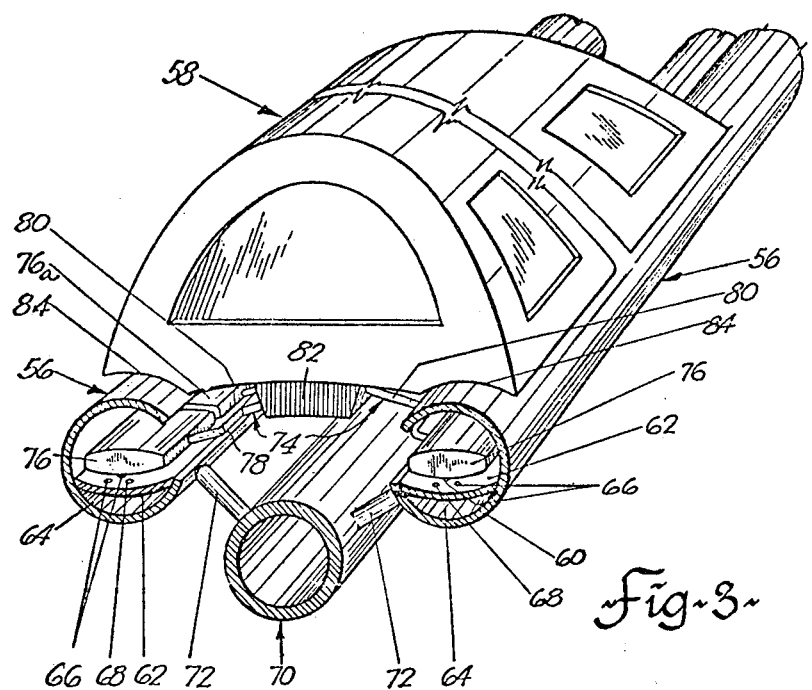
FIGS. 3 and 4 show two examples of more sophisticated passive system.
Figure 4:
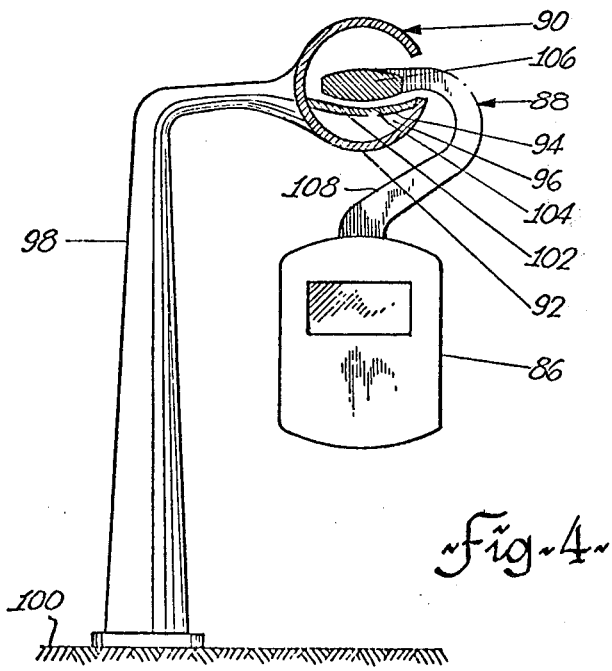

FIGS. 3 and 4 illustrate two types of transportation systems according to the present invention, FIG. 3 showing two-rail support and FIG. 4 showing monorail support. In each instance the support tracks are shown as having a "G" configuration whereby a covering portion of the track extends up and over the track support surface. This provision will protect the track support from the elements, will more positively contain the vehicle support shoe on the track, will reduce the noise of jetting air surrounding a passing vehicle and will tend to increase the end reaction on passive support surfaces.

FIG. 3 shows a dual rail support system in partial cross-section, the particular system shown being a passive system, that is support air is supplied from the rails rather than from the vehicle. The support rails or tracks are designated by reference numbers 56 but only one will be described in detail, it being understood that the two rails are mirror images of each other. The vehicle is designated by reference number 58.

Each rail 56 comprises an outer annular section 60 which has a longitudinal slice removed therefrom such that section 60 covers an arc of approximately 270°. The open portion of the section faces inwardly towards the opposite rail and is adapted to permit a portion of the vehicle suspension system to pass therethrough. As is shown in FIG. 3 the trough portion 62 of rail 56, which portion comprises the rail support surface is positioned within the "C"-section of the rail so that it extends from the lower open edge across to the back of the rail. The trough 62 appears as a concave section and it, along with the lower portion of the "C"-section between the longitudinal edges of the trough defines a longitudinally extending plenum chamber 64.

Construction of the track could be enhanced by having the plenum positioned exteriorly of track section 60, much as in FIG. 2 wherein track section 46 is analagous to track section 60.

In accordance with the principles propounded with respect to FIG. 2, trough 62 is provided wtih two sets of nozzles 66 and 68, which nozzles are spaced longitudinally in the trough and are angled so as to project fluid from the plenum chamber 64 towards the outside of the rail, that is away from the longitudinal opening in section 60. As mentioned regarding FIG. 2, the set 66 is spaced from, but parallel to the set 68 and the nozzles of set 66 alternate longitudinally in the trough with the nozzles of set 68.

If, alternatively, the nozzles are angled towards the inside of the rail the end reaction on the vehicle support would be slightly degraded as would be the silencing effect of the cover rail configuration. However, the jets issuring from nozzles 66 and 68 would tend to be more effective in cleaning the interior of the rail of debris, such as leaves, making the rails effectively self-cleaning. If, on the other hand, the rails are not mirror images because all nozzles are angled in the same direction, any problems which might develop regarding slight variances in track gauge will be reduced.

In the configuration of FIG. 3 a supply pipe 70 is shown between rails 56, 56 with connecting pipes 72 leading therefrom to plenum chambers 64, 64. The combination of rails 56, 56 and pipe 70 forms a triangular truss structure which, when additional braces (not shown) are connected from one rail 56 to the other rail 56, is extremely rigid in bending and permits greater spans between vertical supports or minimal deflection between supports while having little bulk or wind resistance. Such a truss-rail configuration could be construeded at grade, through tunnels, and could even be incorporated into a suspension cable system for traversing long spans.

While not shown in FIG. 3 it would be possible, using valving systems to be described later, to sequence the feeding of pressurized air into the plenum chambers to provide pressure wave propagation to coincide with the passage of the vehicle along the track. Bulkheads could be provided in the plenum chambers to form a plurality of discrete chambers along the track, which chambers would only be pressurized in anticipation of a vehicle, pressurization coming in response to actuation of an appropriate switching and valving system by the vehicle prior to its reaching the chamber to be pressurized. This would, of course, economise in the requirements of pressurized air since it would be suppled only on demand rather than continuously.

Such a system might be termed a linear pneumatic motor as the pressure wave created through the sequential valving of pressurized air imparts a decided impulse to the vehicle and its support.

The vehicle 58 is provided with suspension and support means 74, which are adapted to coact with rails 56, 56 to provide support and guiding for the vehicle. Each support means 74, of which there will be at least two along each side of each vehicle, comprises a pair of articulated support members or "shoes" 76, 76a which have a convex bottom support surface complementary to the curve in trough 62. In fact, the curve of trough 62 and the mating curve of shoe 76 should be close to being, if not exactly, equal so that there is a minimum gap between the shoe and the trough when the wedge of supporting air is in existence. With the exception of the bottom surface of the shoe, the shape thereof is not critical although it should be constructed to give maximum strength while being at least moderately streamlined to facilitate passage along the rails to induce air into the forward portion of the gap and to augment the end reaction at the rear thereof. As shown in FIG. 3 the second shoe 76a is articulated to shoe 76 in any known manner, such as by strut 78. Main strut 80 connects strut 78 to frame member 82, there being limited movement permissible between frame 82 and strut 80, between strut 80 and strut 78 and between strut 78 and shoes 76, 76a, the last mentioned permitted movement being both generally horizontal and vertical for effective negotiation of curves. While a very simple suspension is shown in FIG. 3, it is understood that more sophisticated systems would, in actuality, be used to provide springing of the vehicle and to ensure maintainance of the configurational relationship of the shoes and the trough. An example of such a suspension system is illustrated in FIG. 5 for a dual-rail active system although the same principles could be applied, with suitable modifications to the just-disclosed passive system.

The vehicle 58 is shown as having curved body portions 84 which are complementary with the curved outer portion of rail section 62. These portions permit the vehicle to have a low profile relative to the track and could also be used to contain housings (not shown) from which friction braking means could emerge to contact the rail section 62 for normal or emergency braking of the vehicle. The close proximity of portions 84 to the rail section 62 could also permit the housing within those two sections of a linear motor (not shown) for propulsion of the vehicle along the track. Other means of propulsion, such as by a vehicle-mounted gas turbine jet are also possible, such propulsion being aided by longitudinal as well as transverse angling of the jets in troughs 62. Angling of the jets in the opposite direction to vehicle travel can also be used to aid braking of the vehicle in the vicinity of, for example, the passenger platform at a station. Vertical support by the wedge of air would still be provided in such instances.

FIG. 4 shows a different system configuration from that of FIG. 3 in that it is a monorail system with the vehicle 86 being suspended by support means 88. The rail 90 is similar to the rails 56 in that it comprises a "C"-section 92 and a concavely curved trough or support section 94 forming a longitudinally directed plenum chamber 96. Rail 90 is fixed to a plurality of spaced standards or pylons, one of which is shown by reference number 98 and is anchored in the ground 100 by known means. The sets of nozzles 102, 104 are positioned in trough 94 as in FIG. 2 and are oriented so as to project pressurized air from the plenum chamber into the gap formed between support elements 106 and support trough 94, the direction of projection being preferably towards the pylon 98.

As with the embodiment of FIG. 3, the support means 88 comprises at least a pair of tandemly articulated support elements or shoes 106 to which a standard 108 is pivoted. The standard 108 passes through the opening in rail section 92 and curves back underneath rail 90 to support the vehicle 86 thereon. The vehicle will be pivoted to standard 108 slightly above the vehicle's center of gravity so that wind loads will not adversely affect the generally vertical orientation of the vehicle. The motion of a monorail vehicle under the influence of wind forces and centrifugal forces will be discussed hereinafter.

FIG. 5 illustrates an active system which is shown as adapted for travel over an existing structure which may, for example, be an oil pipe line. In areas such as the far north it is not economical to build a pipe line *and* a rail system as parallel separate entities, and such parallel systems could be very damaging to the ecology of such areas. However, the combination of a pipe line and a rail system could be economically feasible in view of the reduced cost of installing the rail system and the benefits to the regions served by such a system. A transportation system according to the present invention lends itself admirably to utilizing the "rail bed" provided by the pipe line.

In the embodiment shown in FIG. 5 the pipe line 110 is supported above the ground 112 on stands 114 which will, of course, be anchored sufficiently to carry the weight of the pipeline when full of flowing oil (or any other flowable substance for that matter) and the weight of the transportation system components.

Rigidly fixed, as by welding, to the pipe 110 on either side of its longitudinal center line are tracks 116 which are preferably of circular cross-section. Preferably, the tracks 116 project above the uppermost curvature of the pipe 110 although the actual position relative to the pipe will be dictated by the size of the pipe and the vehicle configuration ultimately chosen. For example the tracks 116 might be mounted on wing-like supports which project laterally outwardly from the pipe.

The vehicle is represented by reference number 118 and is illustrated, in this instance, with an on board propulsion unit in the form of a gas turbine jet engine 120 housed in a nacelle on the top of the vehicle body. The vehicle body illustrated is provided with inwardly curved body portions 122 along the lowermost outer longitudinal edges thereof, which portions are adapted to receive flexible members 124. Each member 124 may take the form of a moderately resilient bladder rigidly fixed along its upper surface to the exposed surface of body portion 122. The opposite, or lower surface, of the bladder 124 is rigidly fixed to vehicle support member 126 which member has a concave outer surface which is complementary to the convex outer surface of track 116. Member 126 has the general form illustrated by support member 32 in FIG. 1 in that it is provided with a plenum wall 128 forming a plenum chamber 130 and with sets of nozzles 132 and 134. FIG. 6 shows a shoe 126 in prespective with the plenum wall 128 thereon, and nozzles 130 and 132 therein. Plenum wall 128 is also shown as having an opening 138 therein for the continuous introduction of pressurized fluid, which will exit from nozzles 132, 134 to form the support wedge between shoe 126 and track 116.

Since bladder 124 is rigidly fixed to the vehicle and to the support member 126 it is apparent that most of its flexibility or resiliency will be derived from its side walls 136 and from its contents. It is intended that the bladder will be continuously supplied with air under pressure from a source on board the vehicle, which source could be a bleed from the propulsion unit or a separate air pump. The bladder is, of course, provided with appropriate connections to permit the introduction of the air. The bladder also is provided with appropriate connections to opening 138 in plenum wall 128 so that the plenum chamber 130 will be provided with sufficient air for effective formation of the support wedge.

In summary therefore the support members 126 are separated, but flexibly connected to, the vehicle 118 by bladders 124, which bladders are supplied with pressurized air and in turn supply the plenum chambers of the shoes with pressurized air which ultimately forms the support wedge.

As suggested previously the main pipe 110 might carry crude oil, which oil is normally heated to aid its passage through the pipe. The heat of the oil would, in most instances, be sufficient to keep tracks 116 free of ice or snow during winter conditions. Were it necessary to add further heat it would probably be possible to pass a portion of the heated oil directly through tracks 116, or, alternatively, an external source of heat, maybe electric, may be applied to the track. The jets issuing from the nozzles will, of course, tend to keep the tracks clear of snow, dust, leaves and other movable debris.

The bladders 124 perform three other functions which ensure proper operation of the transportation system. Firstly, they act as springs between the vehicle and the tracks to smooth out the ride of the vehicle especially with small clearances of the support film. Any small movements produced by the trackshoe support system will be effectively damped before they reach the vehicle. Secondly, the bladders by being moderately resilient permit slight transverse shifting of the shoes on the track. This transverse shifting is thus a simple method of compensating for changes in the transverse separation of the tracks. It is very difficult, under real-life conditions, to ensure that the tracks 116 will be kept at exactly the correct separation and hence the compensation by the vehicle for any irregularites drastically reduces the expense which would otherwise be involved with ensuring proper track separation. Needless to say, the transverse movement permitted by the bladders is limited in extent and thus the tracks must perforce be positioned within those limits when they are fixed to the pipe 110. Thirdly, the flexible resilient character of the bladders permit articulation of the shoes relative to the body, within limits of course. Thus, by using shoes which are short relative to the vehicle body, and by using at least two shoes in close proximity at each corner to carry the vehicular weight, the vehicle will negotiate horizontal curves and vertical grade changes with no difficulty.

Figure 8:
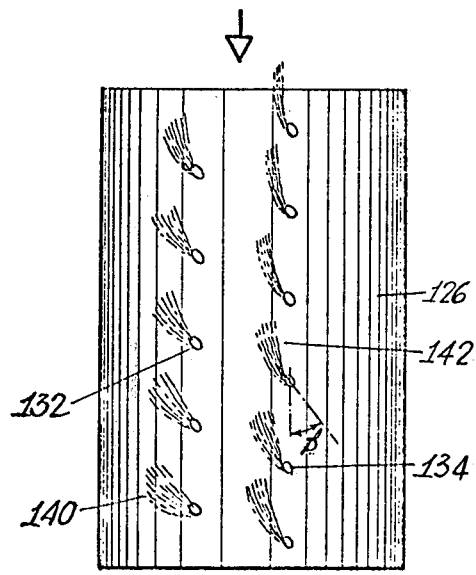

FIGS. 7 and 8 show two sides of the shoe or support member 126 with FIG. 7 including the bladder 124 thereon. As is seen in FIGS. 7 and 8 the nozzles are depicted as having a longitudinal orientation in addition to transverse angled orientation illustrated in FIG. 1. It has been found, as mentioned previously, that higher capabilities are attainable when the jets issuing from the nozzles have longitudinal as well as vertical and horizontal force components. It has been found that when the angle $\beta$ of the nozzles relative to the longitudinal axis of the shoes is in the vicinity of 45° the greatest loads for any one power setting can be carried. In addition stability of the support member relative to the track is enhanced. Also, as shown in FIG. 7, the close proximity of the second shoe 126a to the first, or leading shoe 126 permits exiting fluid from the nozzles of the leading shoe to be rammed under the forward edge of the second shoe and hence there will be little or no discontinuity in the support wedge between the shoes. In fact, while not shown in FIG. 7, it is possible to fair the second shoe into the first shoe to further reduce any disruptive effects on the wedge between the shoes, thereby increasing the load carrying capacity of the second, or following, shoe.

FIG. 8 shows a bottom view of a support member 126 proceeding in the direction of the arrow and depicts the shape of the jets as they leave their respective nozzles. It is very interesting to note that while the jets 140 leaving nozzles 132 fan out in an expected pattern generally in line with the nozzle axis, the jets 142 leaving nozzles 134 very rapidly assume an orientation parallel to the longitudinal axis of the shoe. The jets 142 effectively form a seal along the outermost or thickest boundary of the support wedge and prevent the drawing in of atmospheric air into the wedge. Any atmospheric air induced into the gap between the track and the support member will be swept along by the sealing jets 142. Referring again to FIG. 1 it will be seen that the reaction and impulse force $F_j$ will be due primarily to the jets issuing from nozzles 40 (nozzles 132 in FIG. 5). It should not be assumed however that the jets issuing from nozzles 42 (nozzles 134 in FIG. 5) do not contribute to the reaction force $F_j$ or to the support force $F_s$ even though theirs is mainly a sealing function. In fact it is this sealing phenomenon which eliminates the necessity of a skirt on the upstream side of the jets and helps to differentiate vehicles using the present invention from those using existing air cushion technology.

Figure 9:
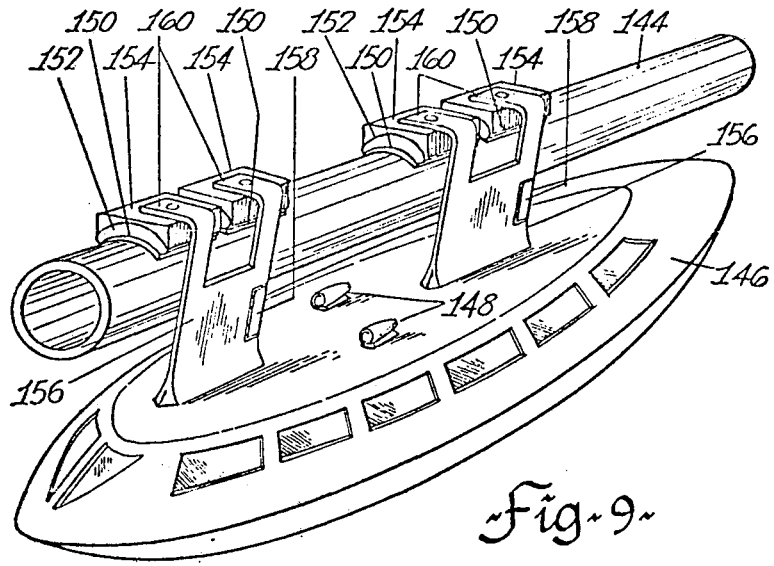
FIG. 9 shows another more sophisticated active system, in perspective.

FIG. 9 illustrates a monorail system which utilizes the principles of an active support mechanism. It is shown as comprising a tubular support track 144 which is supported on pylons (not shown) in the same manner as the system of FIG. 4. In this instance the vehicle is represented by reference number 146 and it is shown as being provided with propulsion means in the form of jet engines 148. It should be understood that FIG. 9 is schematic in nature and the eventual commercial configuration of such a vehicle and/or system could deviate from the representation shown.

In view of the detailed description of the support member and its operation relative to the active system of FIG. 5 the structural details of similar elements used in the present embodiment will not be given. It suffices to note that the support mechanism comprises support members or shoes 150, moderately resilient bladders 152 rigidly fixed to the shoes 150 and having fluid communication with the plenum chambers thereof, and support housings 154 which in turn are rigidly fixed to the bladders 152 opposite shoes 150. While housings 154 are shown as rectangular in cross-section it is understood that they could be streamlined to reduce drag, to feed ram air into the front of at least each leading shoe and to feed air into the front of the following shoe. As shown in FIG. 9 the monorail vehicle may be provided with two pairs of adjacent shoes, one pair being situated toward each end thereof.

Connecting the vehicle to the support members are two standards or struts 156. Each strut may have an airfoil cross-section to reduce drag and may be provided with aircraft-type control surfaces 158 to aid in controlling the vehicle in yaw and roll. Each strut 156 also separates into two portions 160 and each portion is in turn gimballed to its respective support housing 154 whereby the support housing, and hence the support shoe 150 is free to execute limited horizontal and vertical pivoting action. Each strut 156 carries appropriate conduits and valving to supply bladders 152 with the required pressurized air.

As with the monorail system of FIG. 4, the struts 156 are pivotally connected to the vehicle slightly above the center of gravity of the body in order to lessen any tilting of the body due to wind forces. Curves on the other hand are easily negotiated by the monorail system since the vehicle support/rail interaction is such that balance or stability is always maintained. In the embodiment of FIG. 9, for example, centrifugal force will tend to displace struts 156 from their generally vertical plane and the vehicle support shoes, through their connections to the struts will be rotated on the pipe 144 to assume a new position on the pipe periphery. This new position has no bearing on the support system since the support shoes do not see the pipe any differently in their new position than in their old. There is, of course, some lateral displacement of the vehicle body under the influence of centrifugal forces, but once the curve has been negotiated the body, struts and support shoes will return to their generally vertical orientation.

As mentioned previously vehicle/support configurations according to the present invention can be many and varied. For example stability and load-carrying capacity can be increased by increasing the number of support tracks and attendant vehicle support means. In the embodiment of FIG. 5, for example, it would be possible to add two more rails between rails 116, 116 and to provide the vehicle with co-operating support means. A similar change could be made to the monorail system of FIG. 9 by having a second rail or track adjacent track 144 with co-operating support means connected to struts 156. In this instance it would probably be necessary to bank the parallel tracks for curve negotiation. An added advantage of closely spaced adjacent rails is the possibility of inducing air exiting from one support shoe into the wedge area of a parallel shoe to make its operation more efficient. The addition of rails and support means is, of course, equally applicable to active and passive support systems.

Other examples of the versatility of a transportation system according to the present invention will now be described. First of all, the pressurized fluid used for support and propulsion need not be air. It could also be, for example, water or oil and, in fact, an underwater version of a system according to the present invention is not out of the question. There could also be dual, parallel plenums provided along each track, or in each support member, the nozzles from one plenum chamber being in the direction of vehicle advancement, the nozzles of the other plenum chamber being oppositely directed. Thus, one set of nozzles could be used to aid vehicle advancement and the second set could be arbitrarily activated to aid in vehicle retardation in an emergency or on entering a station area. Alternatively the nozzles themselves could be constructed in such a way that they are pivotable whereby the angle of the jets issuing therefrom is alterable to provide optimum load carrying and propulsion (or retardation) force components.

As mentioned with respect to FIG. 3, the vehicle may be provided with means for effecting friction braking with the track. The braking mechanism may take many forms such as pads which are lowered, or raised into contact with the rail. The monorail system lends itself very well to this type of braking since a pad, pivotally mounted to the standard or strut could be raised into contact with the rail, effectively clamping the rail between the shoe and brake. It is understood that when pressurized fluid ceases to flow there will be immediate contact between the shoe and the track, a very effective brake and vehicle lock.

Since the gap between the shoe and the track is very small and is maintained relatively constant (air bearing theory) the gap could be used as the gap in a linear induction motor for vehicle propulsion. Such a motor is, of course, able to retard vehicle progress and thereby aid in braking Considering the embodiments of FIGS. 3 and 4 it becomes apparent that the scale thereof could be expanded such that the vehicle may be contained within a tube or pipe much as the support members 76 or 106 are contained within tracks 56 or 90, respectively. The vehicle would then be analagous to the support members, it being understood that the outer tube would be continuous in its periphery. Many possibilities exist for such a system which could be used underground or underwater, the pressurized air used for support also being used for ventilation or cleaning purposes.

I claim:

1. A vehicular transportation system comprising a vehicle for guided longitudinal movement along a prepared track having a transversely curved support surface, said vehicle comprising body means, propulsion means, and at least two longitudinally spaced apart vehicle support members having flexible connection with said vehicle for limited articulation relative thereto, each of said support members having an outer surface transversely curved to be complementary with said track support surface, one of said curved surfaces being generally concave in cross-section, the other being generally convex in cross-section, the two surfaces converging laterally, the generally concave surface being provided with nozzle means asymmetrically disposed substantially on one side of the longitudinal axis thereof for projecting fluid at an angle thereto to form a wedge of supporting fluid diminishing in thickness in the direction of convergence between said support surface and said outer surfaces whereby said support members are supported above said track by said wedge.

2. The invention of claim 1 wherein said nozzle means are connected to plenum chamber means for containing said pressurized fluid, said nozzle means communicating said plenum chamber means to the exterior of said concave support surface.

3. The invention of claim 2 wherein said angle is such that said fluid when projected will have vertical, horizontal and longitudinal components.

4. The invention of claim 1 wherein bladder means are positioned between said body means and said support members to provide secondary suspension of said vehicle and to permit said limited articulation of said support members in pitch, yaw and roll.

5. A vehicle for use in a transportation system utilizing a longitudinally directed track having a transverse generally convex support surface, said vehicle comprising body means, propulsion means and at least two longitudinally spaced apart vehicle support members having flexible connection with said vehicle for limited articulation relative thereto, each of said support members having a transverse generally concave outer surface to be complementary with said track support surface so that in operation the two surfaces converge laterally and nozzle means in said outer surfaces, asymmetrically disposed substantially on one side of the longitudinal axis thereof for projecting fluid at an angle thereto to form a wedge of supporting fluid diminishing in thickness in the direction of convergence between said outer surface and said track support surface for supporting said support members above said track thereby.

6. A vehicular transportation system comprising a vehicle for guided longitudinal movement along a prepared track having an transversely curved support surface, said vehicle comprising body means, propulsion means and at least two longitudinally spaced apart vehicle support members having flexible connection with said vehicle for limited articulation relative thereto, each of said support members having an outer surface transversely curved to be complementary with said track support surfaces, one of said curved surfaces being generally concave in cross-section, the other being generally convex in cross-section and compliant in texture, the two surface converging laterally the generally concave surface being provided with nozzle means asymmetrically disposed substantially on one side of the longitudinal axis thereof for projecting fluid at an angle oriented transversely and longitudinally thereto to form a wedge of supporting fluid diminishing in thickness in the direction of convergence between said support surface and said outer surfaces whereby said support members are supported above said track by said wedge.

7. The invention of claim 6 wherein bladder means are positioned between said body means and said support members to provide secondary suspension of said vehicle and to permit said limited articulation of said support members in pitch, yaw and roll.

\* \* \* \* \*